US011685459B2

(12) United States Patent
Bonanno

(10) Patent No.: US 11,685,459 B2
(45) Date of Patent: Jun. 27, 2023

(54) HUMAN-POWERED VEHICLE UPON WHICH USERS CAN RIDE

(71) Applicant: Robert Bonanno, Newark, NJ (US)

(72) Inventor: Robert Bonanno, Newark, NJ (US)

( * ) Notice: Subject to any disclaimer, the term of this patent is extended or adjusted under 35 U.S.C. 154(b) by 162 days.

(21) Appl. No.: 17/226,825

(22) Filed: Apr. 9, 2021

(65) Prior Publication Data
US 2021/0316810 A1 Oct. 14, 2021

Related U.S. Application Data

(60) Provisional application No. 63/008,407, filed on Apr. 10, 2020.

(51) Int. Cl.
*B62K 7/04* (2006.01)
*B62K 15/00* (2006.01)
*B62K 27/02* (2006.01)
*B62K 5/003* (2013.01)

(52) U.S. Cl.
CPC ............... *B62K 7/04* (2013.01); *B62K 5/003* (2013.01); *B62K 15/006* (2013.01); *B62K 27/02* (2013.01)

(58) Field of Classification Search
CPC ........ B62K 5/003; B62K 7/04; B62K 15/006; B62K 27/02

USPC ......................................................... 280/202
See application file for complete search history.

(56) References Cited

U.S. PATENT DOCUMENTS 1,292,445 A * 1/1919 Drexler .................. B62K 3/002
280/220
6,808,187 B1 * 10/2004 Harris ...................... B62K 3/12
280/87.041

* cited by examiner

*Primary Examiner* — Kevin Hurley
*Assistant Examiner* — Felicia L. Brittman
(74) *Attorney, Agent, or Firm* — Gearhart Law LLC

(57) ABSTRACT

A foldable human-powered vehicle upon which users can ride is described. The vehicle includes a wheel assembly, a deck assembly, a seating assembly, a handle assembly, a deck support frame, and a brake assembly. The vehicle also includes a first and a second bicycle having a first handle disposed opposite a second handle. A first handle of the second bicycle is affixed to a second handle of a portion of the handle assembly to affix the second bicycle to the vehicle. A second handle of the first bicycle is affixed to a first handle of a portion of the handle assembly to affix the first bicycle to the vehicle. The vehicle also includes a rear component affixed to a portion of the deck assembly, where a head tube of a third bicycle is affixed to the rear component to affix the third bicycle to the vehicle.

15 Claims, 7 Drawing Sheets

HUMAN-POWERED VEHICLE UPON WHICH USERS CAN RIDE

CROSS REFERENCE TO RELATED APPLICATION

This application claims priority to U.S. Provisional Application No. 63/008,407 filed Apr. 10, 2020. The disclosure of which is incorporated herein by reference.

FIELD OF THE EMBODIMENTS

The field of the invention and its embodiments relate to a human-powered vehicle upon which passengers can ride. In particular, the present invention and its embodiments provide a foldable and balance-less human-powered vehicle, useful for recreation, exercise, rehabilitation, and/or therapy purposes, that allows for group travel from a first location to a second location.

BACKGROUND OF THE EMBODIMENTS

Human-powered land vehicles, such as bicycles, recumbent bicycles, longboards, luges, skateboards, scooters, roller blades, etc. allow a user to propel himself or herself, using a combination of gravity and human muscle, for exercise, rehabilitation, and/or therapy purposes. However, typically only one or a few users (e.g., a tandem bicycle) can enjoy a vehicle like this at one time period. Moreover, use of these vehicles can be dangerous, as they require significant balance skills and are often close to the ground. Additionally, these vehicles are often heavy and are difficult to transport.

No solution in the technical field currently provides a foldable, safe, and balance-less human-powered land vehicle for group travel, whereby the passengers may sit, stand, lay, and/or otherwise engage with the vehicle to propel the vehicle forward. Thus, a need exists for an improved human-powered vehicle upon which users can ride.

REVIEW OF RELATED TECHNOLOGY

U.S. Published Patent Application No. 2007/0187164 A1 describes a scooter with a variable wheel configuration capable of being configured from a two-wheeled vehicle to a three-wheeled vehicle and vice-versa. The scooter includes: a frame for supporting and carrying a rider or a passenger and containing a battery and a controller; a steering assembly mounted on the front of the frame to pivot in left and right directions for steering, the steering assembly having a lower portion to which a front wheel is rotatable mounted and an upper portion provided with a handgrip for a rider to steer, a brake lever, an actuator control lever, and a throttle grip; a mount formed at a rear end of the frame in one-piece, the mount having a first mounting portion on one end and a second mounting portion on the other end; a first driving unit detachably mounted on the first mounting portion of the mount for a two-wheeled configuration or on the second mounting portion of the mount for a three-wheeled configuration; and a second driving unit detachably mounted to the first mounting portion and connected to the first driving unit for the three-wheeled configuration.

U.S. Pat. No. 6,511,087 B1 describes a jogging kick scooter that is constructed to include a rectangular open base frame, a track assembly formed of rolls and an endless belt and mounted in the open base frame, a steering control handlebar mounted in the front side of the open base frame to hold and control steering of a front wheel, two rear wheels bilaterally coupled to the open base frame at a rear side, and transmission gear sets respectively connected between the rear wheels and the wheel axle of the last roll of the track assembly and adapted to rotate the rear wheels when the user walks or runs on the track assembly.

U.S. Published Patent Application No. 2002/0020980 A1 describes a folding and collapsible kick scooter includes a footplate holding a rear wheel, a spring-supported rear brake unit installed in the rear side of the footplate and adapted to stop the rear wheel from rotation, a handlebar and front fork assembly coupled to the front side of the footplate and holding a front wheel, a folding structure coupled between the handlebar and front fork assembly and the footplate and adapted to lock the handlebar and front fork assembly between an extended position and a collapsed position, the handlebar and front fork assembly having a detachable handlebar unit controlled by a press-control locking device to lock/unlock handgrips.

U.S. Pat. No. 6,367,829 B1 describes a folding collapsible kick scooter that includes a footplate, a head tube collapsible coupled to the front side of the footplate by a joint and lock unit, a stem moved in and out of the head tube and releasably locked in position by a quick-release lock, a handlebar connector mounted on the top end of the stem to hold two handlebars, a press control lock installed in the handlebar connector and adapted to lock the handlebars between two positions, a front wheel holder fixedly fastened to the bottom end of the head tube and holding a front wheel on a front suspension arm thereof, a rear wheel holder fixedly fastened to the rear side of the footplate and holding a rear wheel on a rear suspension arm thereof, and a rear fender pivoted to the rear wheel holder and supported on spring means and served as a foot brake for stopping the rear wheel from rotation.

U.S. Pat. No. 6,808,187 B1 describes a tandem scooter for allowing two people to ride comfortably on one scooter. The tandem scooter includes a wheel assembly including front, middle, and rear wheels members, and also including front, middle, and rear wheel axles upon which the front, middle, and rear wheel members are mounted; and also includes a deck assembly including a deck being mounted upon the wheel assembly and upon which users stand when using the tandem scooter; and further includes a handle assembly being attached to the wheel assembly and to the deck assembly; and also includes a deck support frame being attached to the deck and to the handle assembly; and further includes a brake assembly being attached to the handle assembly and being engageable to the front wheel member.

U.S. Pat. No. 5,282,639 A describes a folding tandem bicycle includes a front body part, a rear body part, an intermediate body part connected between the front body part and the rear body part by parallel pairs of upright tubes and pairs of connecting devices, a front transmission mechanism driven by a set of pedals through a front sprocket to rotate a front flywheel and a front wheel through a cable, and a rear transmission mechanism driven by a set of pedals through a rear sprocket to rotate a rear flywheel and a rear wheel through a chain. By disconnecting either one of each pair of connecting devices, the front body part, the intermediate body part and the rear body part are allowed to be folded up and attached with one another side by side. By disconnecting the intermediate body part from the front and rear body parts, the front and rear body parts are connected into a single-seat bicycle for one rider.

U.S. Pat. No. 6,250,656 B1 describes a steerable toy comprising a rigid, elongated footboard defined by an upper surface and front and rear terminal ends and horizontally supported slightly above ground level by a pair of spaced-apart small diameter wheels flexibly journaled thereunder inboard from the rear terminal end to support a rider in standing position, the front end supported above the ground by a large diameter wheel pivotally attached through an articulatable junction connected through an A-frame to the front terminal end of the footboard and steerable with a handle bar assembly in communication with to the wheel and, a flat portion of the footboard aft of the small diameter support wheels pitched upward at an angle to the footboard for stepping on by the rider to pitch the skateboard upward at the small diameter support wheels during certain maneuvers.

U.S. Pat. No. 6,279,929 B1 describes a two-wheel scooter-like vehicle is adapted for use by acrobatic adults by using not only the wheels, but a snag-free, omni-directional sliding surface, under a large standing area, which may be maneuvered by a rider into engagement with the ground and ground-supported objects to perform a variety of tricks and displays of acrobatic skill.

Various human-powered land vehicles are known in the art. However, their means of operation are substantially different from the present disclosure, as the other inventions fail to solve all the problems taught by the present disclosure. The present invention and its embodiments provide a human-powered vehicle upon which users can ride. In particular, the present invention and its embodiments provide a foldable and balance-less human-powered vehicle, useful for recreation, exercise, rehabilitation, and/or therapy purposes, that allows for group travel from a first location to a second location.

SUMMARY OF THE EMBODIMENTS

The present invention and its embodiments provide a human-powered vehicle upon which users can ride. In particular, the present invention and its embodiments provide a foldable and balance-less human-powered vehicle, useful for recreation, exercise, rehabilitation, and/or therapy purposes, that allows for group travel from a first location to a second location.

A first embodiment of a human-powered vehicle upon which users can ride is described. The vehicle includes a wheel assembly, a deck assembly, a seating assembly, a handle assembly, a deck support frame, and a brake assembly. The wheel assembly may include wheel members and sets of axles upon which the wheel members are mounted. The wheel assembly may also include bracket members upon which the sets of axels are mounted and fender members disposed about the wheel members and mounted to the bracket members.

The deck assembly may have a first side disposed opposite a second side, where the second side of the deck assembly is mounted upon the wheel assembly. The deck assembly may include at least four portions independent from one another. The seating assembly may include at least four seat portions independent from one another, where each of the at least four seat portions has a first side disposed opposite a second side. The second side of each of the at least four seat portions is affixed to a component, where each component is affixed to the wheel assembly.

In some examples, the second side of each of the at least four seat portions of the seating assembly comprises at least two extension components. The at least two extension components are configured to extend from the second side of a first seat portion to the second side of a second seat portion of the at least four seat portions. When extended, the at least two components are configured to receive another seat portion between the first seat portion and the second seat portion.

The handle assembly includes at least a first handle portion and a second handle portion. The first handle portion is attached to a first member of the wheel members and to a first portion of the at least four portions of the deck assembly. The second handle portion is attached to a middle member of the wheel members and to a third portion of the at least four portions of the deck assembly.

In some examples, the second handle portion of the at least two handle portions comprises a first handle disposed opposite a second handle. The vehicle may further include a first bicycle having a first handle disposed opposite a second handle and a second bicycle having a first handle disposed opposite a second handle. A second handle of the first bicycle is affixed to the first handle of the second handle portion to affix the first bicycle to the human-powered vehicle. Further, a first handle of the second bicycle is affixed to a second handle of the second handle portion to affix the second bicycle to the human-powered vehicle. The deck support frame is attached to the deck assembly and to the handle assembly. The brake assembly is attached to the handle assembly and is engageable to the wheel members.

Further, each of the users may engage in an action when using the human-powered vehicle. The action may include: standing upon the first side of a portion of the at least four portions of the deck assembly, sitting upon the first side of a portion of the at least four seat portions of the seating assembly, and laying between the first seat portion, the other seat portion, and the second seat portion.

In some examples, the vehicle may also include a rear component affixed to a first side of all portions of the deck assembly. A head tube of a third bicycle is affixed to the rear component to affix the third bicycle to the human-powered vehicle.

A second embodiment of a human-powered vehicle upon which users can ride is described. The human-powered vehicle is foldable. The human-powered vehicle includes a wheel assembly, a deck assembly, a seating assembly, a handle assembly, a deck support frame, and a brake assembly. The wheel assembly may include wheel members, sets of axles upon which the wheel members are mounted, bracket members upon which the sets of axels are mounted, and fender members disposed about the wheel members and mounted to the bracket members.

A deck assembly has a first side disposed opposite a second side. The second side of the deck assembly is mounted upon the wheel assembly. The deck assembly comprises at least four portions independent from one another. A first portion and a third portion of the at least four portions of the deck assembly comprise a first shape. A second portion and a fourth portion of the at least four portions of the deck assembly comprise a second shape. The first shape differs from the second shape. In some examples, a portion of the at least four portions of the deck assembly comprises a receptacle configured to house one or more objects.

A seating assembly comprises at least four seat portions independent from one another, where each of the at least four seat portions has a first side disposed opposite a second side. The second side of each of the at least four seat portions is affixed to a component. Each component is affixed to the wheel assembly.

A handle assembly comprises at least a first handle portion and a second handle portion. The first handle portion is attached to a first member of the wheel members and to a first portion of the at least four portions of the deck assembly. The second handle portion is attached to a middle member of the wheel members and to a third portion of the at least four portions of the deck assembly. The second handle portion of the at least two handle portions comprises a first handle disposed opposite a second handle.

The deck support frame is attached to the deck assembly and to the handle assembly. The brake assembly is attached to the handle assembly and is engageable to the wheel members.

The vehicle also includes a first bicycle having a first handle disposed opposite a second handle and a second bicycle having a first handle disposed opposite a second handle. A second handle of the first bicycle is affixed to a first handle of the second handle portion to affix the first bicycle to the human-powered vehicle. A first handle of the second bicycle is affixed to a second handle of the second handle portion to affix the second bicycle to the human-powered vehicle.

The vehicle further includes a rear component affixed to a portion of the deck assembly. A head tube of a third bicycle is affixed to the rear component to affix the third bicycle to the vehicle. In some examples, the first bicycle, the second bicycle, and the third bicycle are foldable.

A third embodiment of a foldable human-powered vehicle upon which users can ride is described. The human-powered vehicle includes a wheel assembly, a deck assembly, a seating assembly, a handle assembly, a deck support frame, and a brake assembly. The wheel assembly includes wheel members and sets of axles upon which the wheel members are mounted. The wheel assembly also includes bracket members upon which the sets of axles are mounted and fender members disposed about the wheel members and mounted to the bracket members.

The deck assembly includes a first side disposed opposite a second side. The second side of the deck assembly is mounted upon the wheel assembly. The deck assembly comprises at least four portions independent from one another.

The seating assembly comprises at least four seat portions independent from one another, where each of the at least four seat portions has a first side disposed opposite a second side. The second side of each of the at least four seat portions is affixed to a component. Each component is affixed to the wheel assembly.

The second side of each of the at least four seat portions of the seating assembly comprises at least two extension components. The at least two extension components are configured to extend from the second side of a first seat portion to the second side of a second seat portion. When extended, the at least two extension components are configured to receive another seat portion between the first seat portion and the second seat portion.

The handle assembly comprises at least a first handle portion and a second handle portion. The first handle portion is attached to the first wheel member and to a first portion of the at least four portions of the deck assembly. The second handle portion is attached to the middle wheel member and to a third portion of the at least four portions of the deck assembly. The second handle portion of the at least two handle portions comprises a first handle disposed opposite a second handle. The deck support frame is attached to the deck assembly and to the handle assembly. The brake assembly is attached to the handle assembly and is engageable to the wheel members.

The foldable human-powered vehicle also includes a first bicycle and a second bicycle. The first bicycle has a first handle disposed opposite a second handle and the second bicycle has a first handle disposed opposite a second handle. A second handle of the first bicycle is affixed to a first handle of the second handle portion to affix the first bicycle to the human-powered vehicle. A first handle of the second bicycle is affixed to a second handle of the second handle portion to affix the second bicycle to the human-powered vehicle.

The foldable human-powered vehicle also includes a rear component affixed to a portion of the deck assembly. A head tube of a third bicycle is affixed to the rear component to affix the third bicycle to the human-powered vehicle. In examples, the first bicycle, the second bicycle, and the third bicycle are foldable.

Each of the users engages in an action when using the human-powered vehicle, where the action may include: pushing off the ground with a foot of the user, pedaling pedals on a bicycle of the first bicycle, the second bicycle, and the third bicycle, standing upon the first side of a portion of the at least four portions of the deck assembly, sitting upon the first side of a portion of the at least four seat portions of the seating assembly, and laying between the first seat portion, the other seat portion, and the second seat portion.

In general, the present invention succeeds in conferring the following benefits and objectives.

It is an object of the present invention to provide a human-powered vehicle allowing multiple passengers to travel from a first location to a second location.

It is an object of the present invention to provide a human-powered vehicle useful for recreation, exercise, rehabilitation, and/or therapy purposes.

It is an object of the present invention to provide a group travel vehicle allowing multiple passengers to travel from a first location to a second location.

It is an object of the present invention to provide a safe alternative to a vehicle, such as a mountain bike, as the present invention does not require cycling or balancing skills on the part of the user or passenger.

It is an object of the present invention to provide a non-balance human-powered vehicle allowing multiple passengers to travel from a first location to a second location.

It is an object of the present invention to provide a human-powered vehicle allowing one or more passengers to travel with the vehicle by: pushing off the ground with a foot of the user, pedaling pedals on a bicycle affixed to the vehicle, standing upon a portion of the deck assembly, sitting upon a seat portion of the seating assembly, laying between two or more seat portions, and engaging in an exercise while holding onto a portion of the vehicle.

DESCRIPTION OF THE PREFERRED EMBODIMENTS

Figure 1:
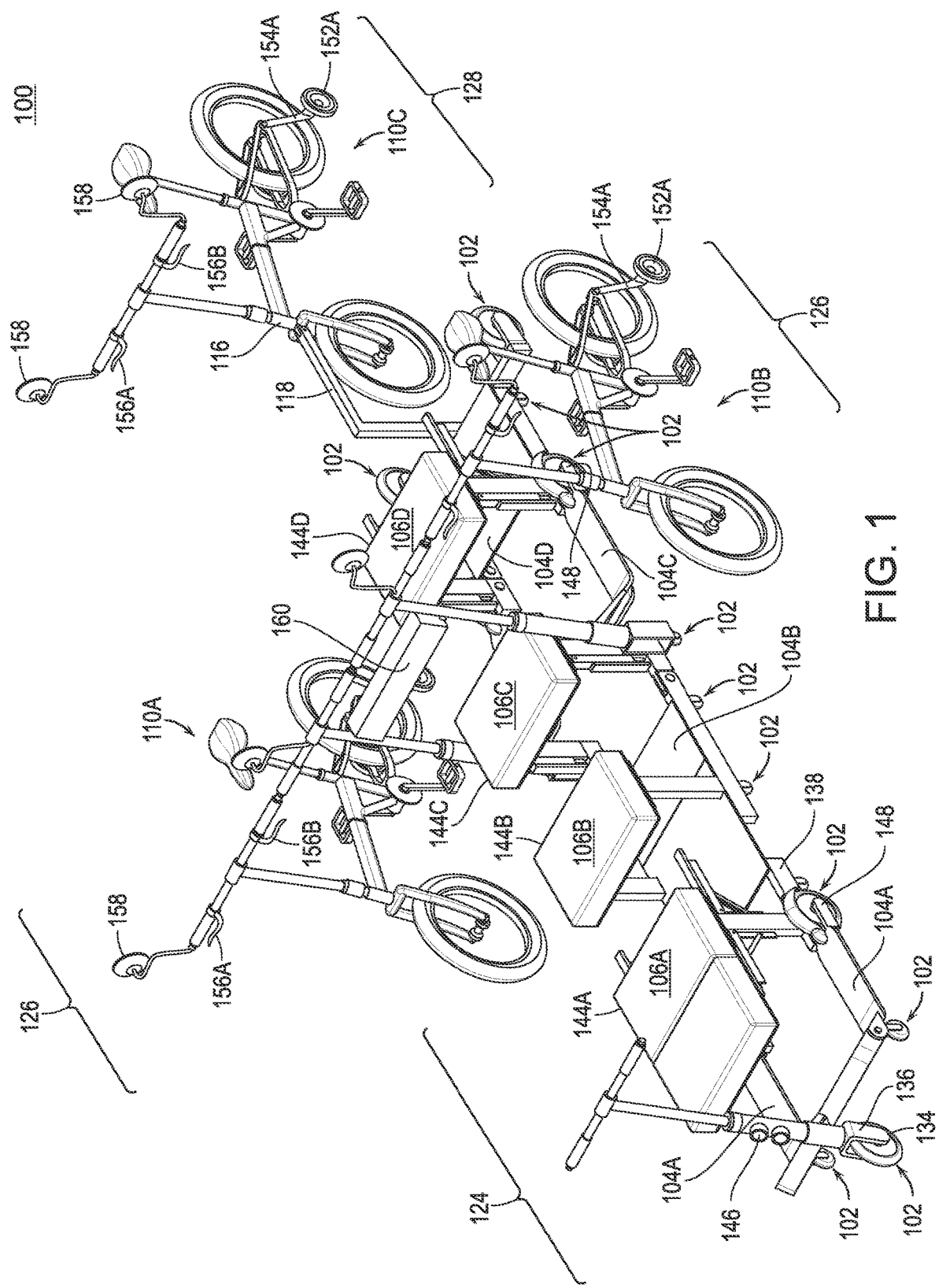
FIG. 1 depicts a perspective view of a human-powered vehicle upon which users can ride, according to at least some embodiments described herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
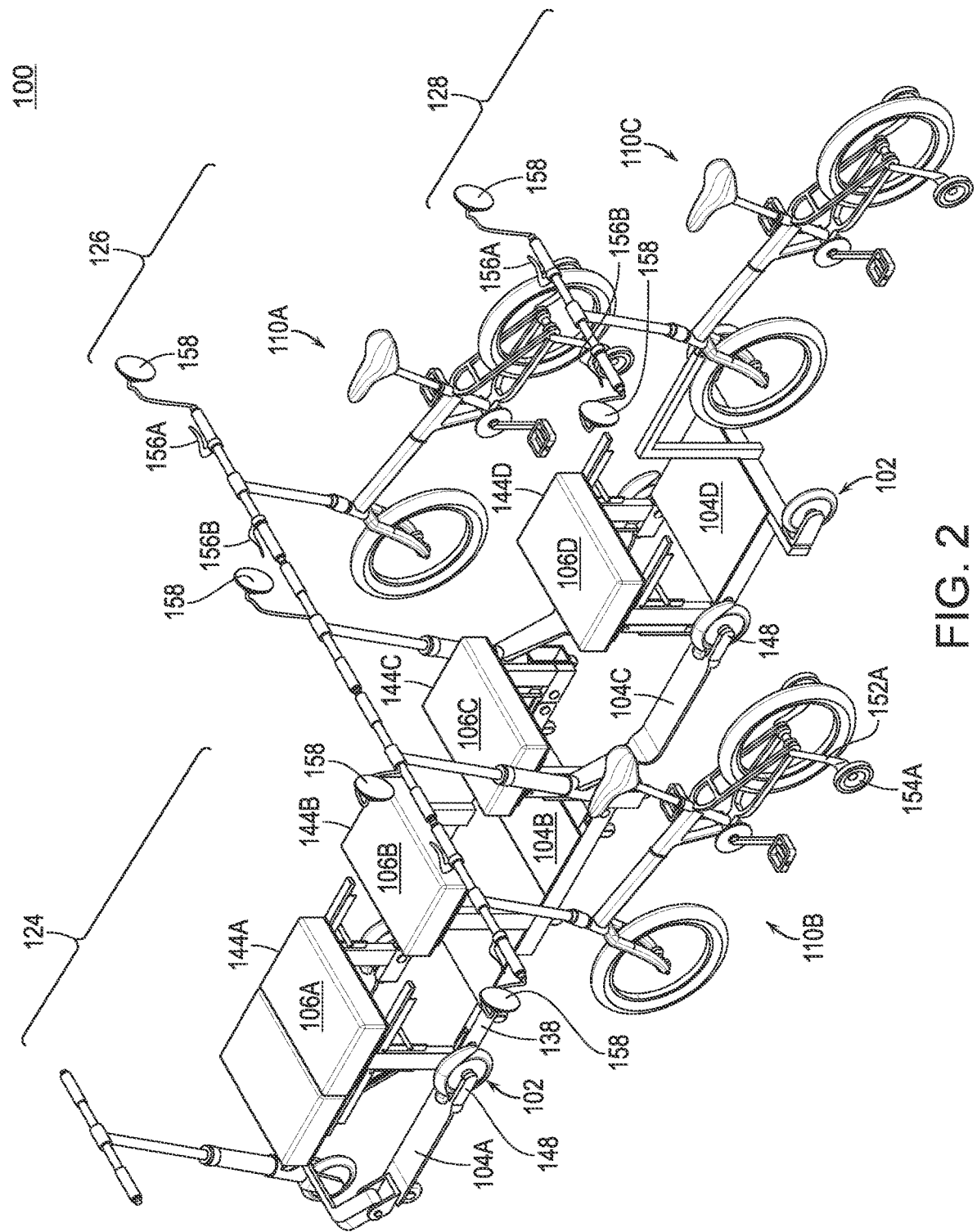
FIG. 2 depicts another perspective view of a human-powered vehicle upon which users can ride, according to at least some embodiments described herein.

A human-powered vehicle 100 upon which multiple passengers can travel is depicted in FIG. 1 and FIG. 2. The human-powered vehicle 100 is powered by the passengers and gravity. The passengers need not balance when utilizing the human-powered vehicle 100, and as such, the human-powered vehicle 100 is a non-balance vehicle. Thus, the human-powered vehicle 100 provides a safe alternative to a human-powered land vehicle, such as a mountain bike, as the human-powered vehicle 100 does not require cycling or balancing skills on the part of the user or passenger. It should be appreciated that the uses for the human-powered vehicle 100 are limitless and may include: recreation, exercise, rehabilitation, and/or therapy purposes. Moreover, the human-powered vehicle 100 may be used on a street, a bicycle path, a bicycle lane, a boardwalk, etc.

The human-powered vehicle 100 generally includes a middle portion 126 disposed between a first portion (e.g., a front portion) 124 and a second portion (e.g., a rear portion) 128. The first portion 124 of the human-powered vehicle 100 may be depicted in FIG. 1, FIG. 2, FIG. 3, FIG. 5, and FIG. 7. The middle portion 126 of the human-powered vehicle 100 may be depicted in FIG. 1, FIG. 2, FIG. 3, FIG. 4, FIG. 6, and FIG. 7. The second portion 128 of the human-powered vehicle 100 may be depicted in FIG. 1, FIG. 2, FIG. 3 and FIG. 7. The human-powered vehicle 100 includes multiple assemblies, such as: a wheel assembly, a deck assembly, a seating assembly, a handle assembly, a deck support frame, and a brake assembly.

The wheel assembly includes wheel members (e.g., wheels) 102. It should be appreciated that the quantity of wheel members 102 is non-exhaustive. In some examples, each of the wheel members 102 may include a pair of wheels parallel to one another. Each of the wheels may be: approximately 8 inches and may comprise a polyurethane material, may be approximately 2½ inches and may comprise a polyurethane swivel caster material, and/or may be approximately 3 inches and may comprise the polyurethane swivel caster material. It should be appreciated that the size and composition of each of the wheel members 102 may be identical. However, in other examples, the size and composition of each of the wheel members 102 may differ.

In some examples, each of the wheel members 102 may have locking brakes. In further examples, each of the wheel members 102 may have a shock absorbing feature to provide a smooth ride for the passengers. Moreover, in other examples, each of the wheel members 102 are associated with a wheel bearing (not shown). In examples, the wheel bearing is an axial rotational bearing, which may include a plain bearing, a bushing, a journal bearing, among others.

As depicted in FIG. 1, the wheel assembly also includes sets of axles 134 upon which the wheel members 102 are mounted and may also include bracket members 136 upon which the sets of axels 134 are mounted. It should be appreciated that though the sets of axels 134 and the bracket members 136 are shown in FIG. 1 with respect to the first portion 124 of the human-powered vehicle 100, the middle portion 126 and the second portion 128 of the human-powered vehicle 100 may have similar components. Moreover, in some examples, the wheel assembly also includes fender members (not shown) disposed about the wheel members 102 and mounted to the bracket members 136.

Figure 5:
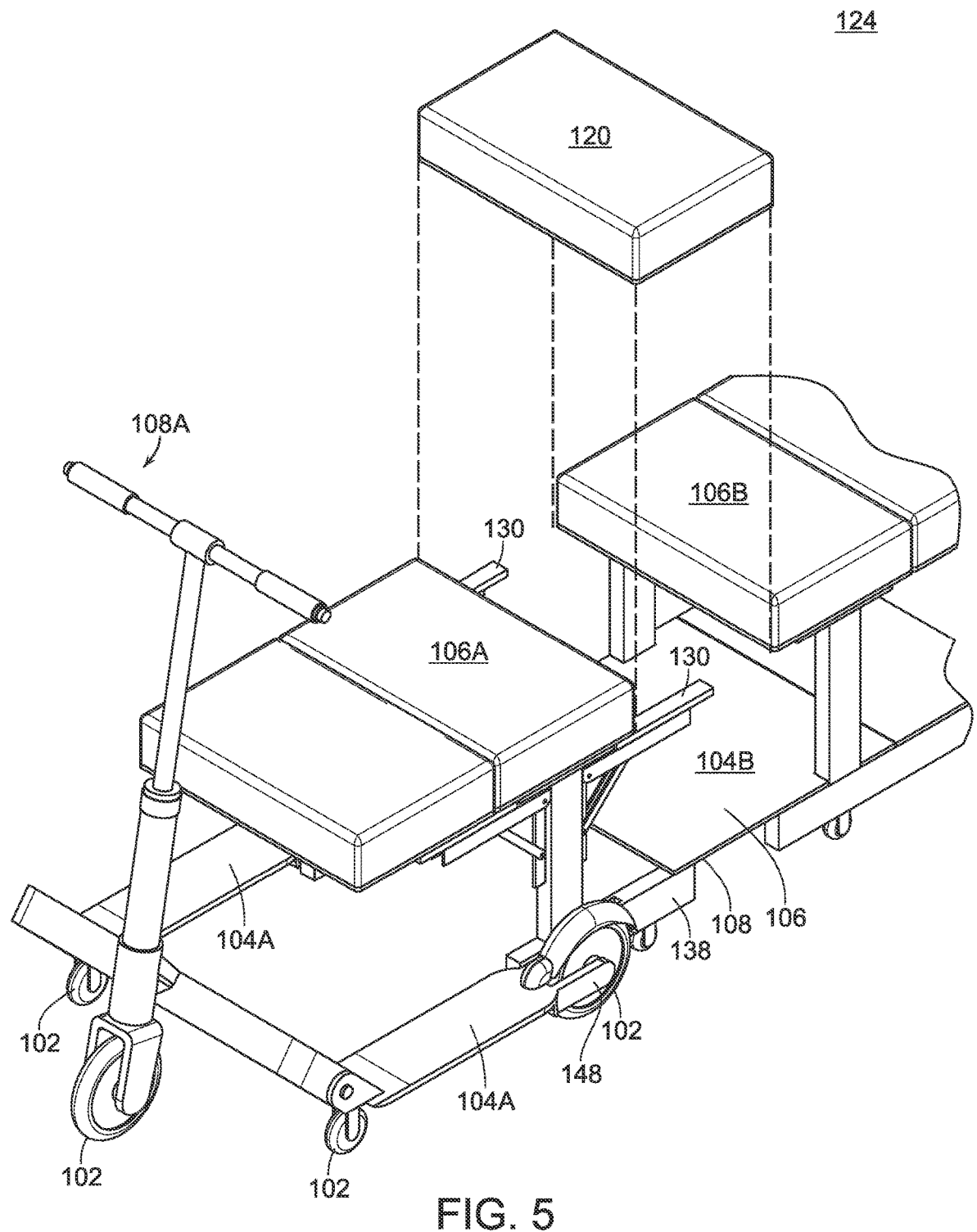
FIG. 5 depicts a perspective view of a front portion of a human-powered vehicle, where a new seat portion is configured to be received by at least two extension components that extend from a second side of a first seat portion to a second side of a second seat portion, such that the new seat portion resides between the first seat portion and the second seat portion, according to at least some embodiments described herein.

The deck assembly of the human-powered vehicle 100 includes a first side 106 disposed opposite a second side 108, as depicted in FIG. 5. The deck assembly places the passengers a safe, approximately 24 inches, above the road or street upon which the human-powered vehicle 100 engages. The first side 106 of the deck assembly may comprise an anti-slip material. The second side 108 of the deck assembly is mounted upon the wheel assembly.

The deck assembly comprises four portions 104A, 104B, 104C, 104D independent from one another, as depicted in at least FIG. 1 at FIG. 2. In some examples, the deck assembly may comprise more than the four portions 104A, 104B, 104C, 104D. In other examples, the deck assembly may comprise less than the four portions 104A, 104B, 104C, 104D.

Figure 4:
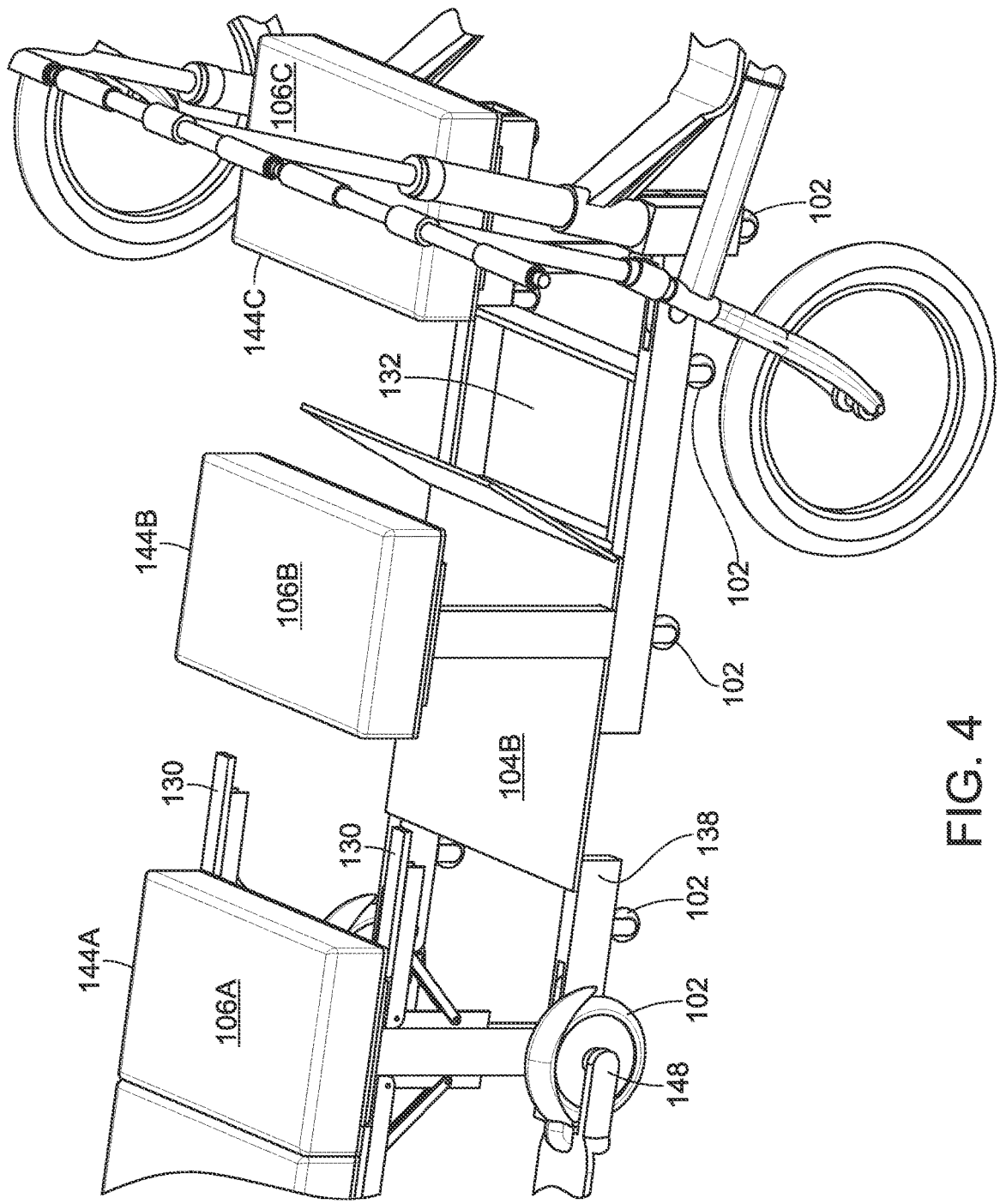
FIG. 4 depicts a perspective view of a middle portion of a human-powered vehicle that includes a receptacle configured to house one or more objects, according to at least some embodiments described herein.

A second portion 104B of the four portions 104A, 104B, 104C, 104D of the deck assembly comprises a receptacle 132 configured to house one or more objects, as depicted in FIG. 4. In some examples, the receptacle 132 houses a toolkit including tools for maintenance on the human-powered vehicle 100. In examples, the receptacle 132 may be held in place via Velcro, or via another fixation means.

Moreover, a first portion 104A and a third portion 104C of the deck assembly comprise a first shape and a second portion 104B and a fourth portion 104D of the deck assembly comprise a second shape. In some examples, the first shape differs from the second shape. In other examples, the first shape is identical to the second shape.

As depicted in at least FIG. 1 and FIG. 2, the first shape of the first portion 104A and the third portion 104C includes two rectangular portions that are parallel to one another and are separated by a distance. The two rectangular portions are parallel to the length of the human-powered vehicle 100. The second shape of the second portion 104B and the fourth portion 104D is a rectangular or a square shape that is perpendicular to the length of the human-powered vehicle 100. It should be appreciated that the first shape and the second shape of the four portions 104A, 104B, 104C, 104D of the deck assembly are provided for illustrative purposes only and the shapes and configurations of these portions are non-limiting.

As depicted in at least FIG. 1, FIG. 2, FIG. 3, and FIG. 7, the seating assembly of the human-powered vehicle 100 includes four seat portions 106A, 106B, 106C, 106D independent from one another. In other examples, the human-powered vehicle 100 includes more portions than the four seat portions. In further examples, the human-powered vehicle 100 includes less than the four seat portions.

Each of the four seat portions 106A, 106B, 106C, 106D may be substantially square or rectangular in shape. Each of the four seat portions 106A, 106B, 106C, 106D has a first side disposed opposite a second side. The passengers may sit upon the first side of each of the four seat portions 106A, 106B, 106C, 106D and may face in any direction. The second side of each of the four seat portions 106A, 106B, 106C, 106D is affixed to a component, which is affixed to the wheel assembly.

Figure 3:
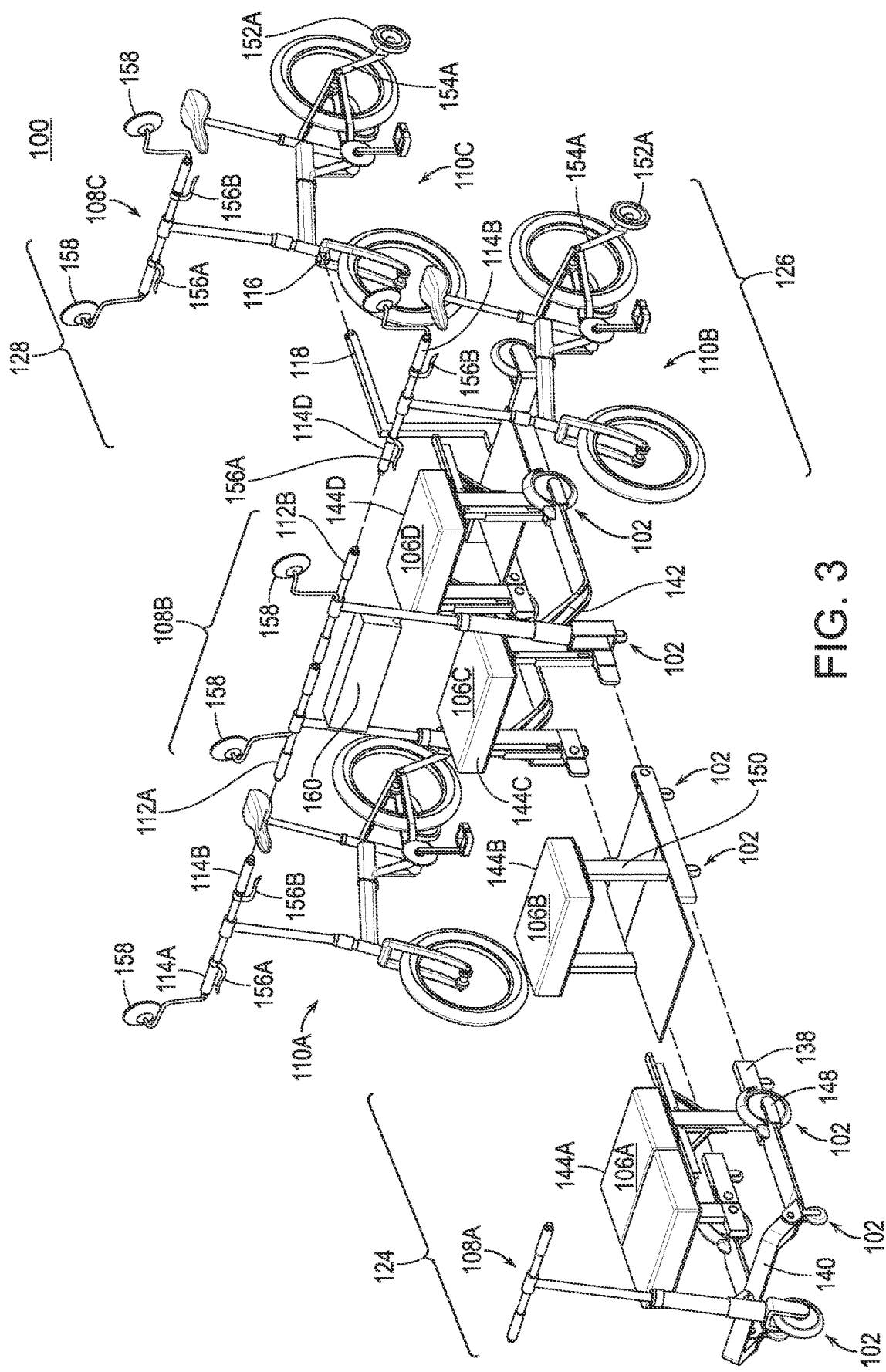
FIG. 3 depicts another perspective view of a human-powered vehicle upon which users can ride, according to at least some embodiments described herein.

As an illustrative example, and as depicted in FIG. 3, the second side of the second seat component 106B is affixed to a component 150, which is then affixed to the wheel assembly. It should be appreciated that, though not depicted, the second side of the first seat portion 106A, the third seat portion 106C, and the fourth seat portion 106D are affixed to components similar to the component 150, which are then affixed to the wheel assembly.

As an illustrative example, a passenger may be a "driver" and may be in a sitting or prone position on the first side of the first seat portion 106A. In the prone position, the driver is oriented head-first along the axis of travel and is positioned about the deck assembly.

Each of the four seat portions 106A, 106B, 106C, 106D may also include a cushion 144A, 144B, 144C, and 144D, respectively (as depicted in at least FIG. 1, FIG. 2, FIG. 3, and FIG. 7). In examples, the cushion may be approximately 2½ inches thick by 12 inches deep by 16 inch wide foam. In another example, each cushion 144A, 144B, 144C, and 144D may be approximately 16 inches in length by 12 inches in width by 2½ inches in height. In other examples, each cushion 144A, 144B, 144C, and 144D may be wrapped in an exterior grade marine vinyl material. In some examples, the third seat portion 106C may also include a backrest 160 (as depicted in FIG. 1 and FIG. 3) that is approximately 16 inches in length by 2 inches wide and by 2¾ inches in height.

Figure 6:
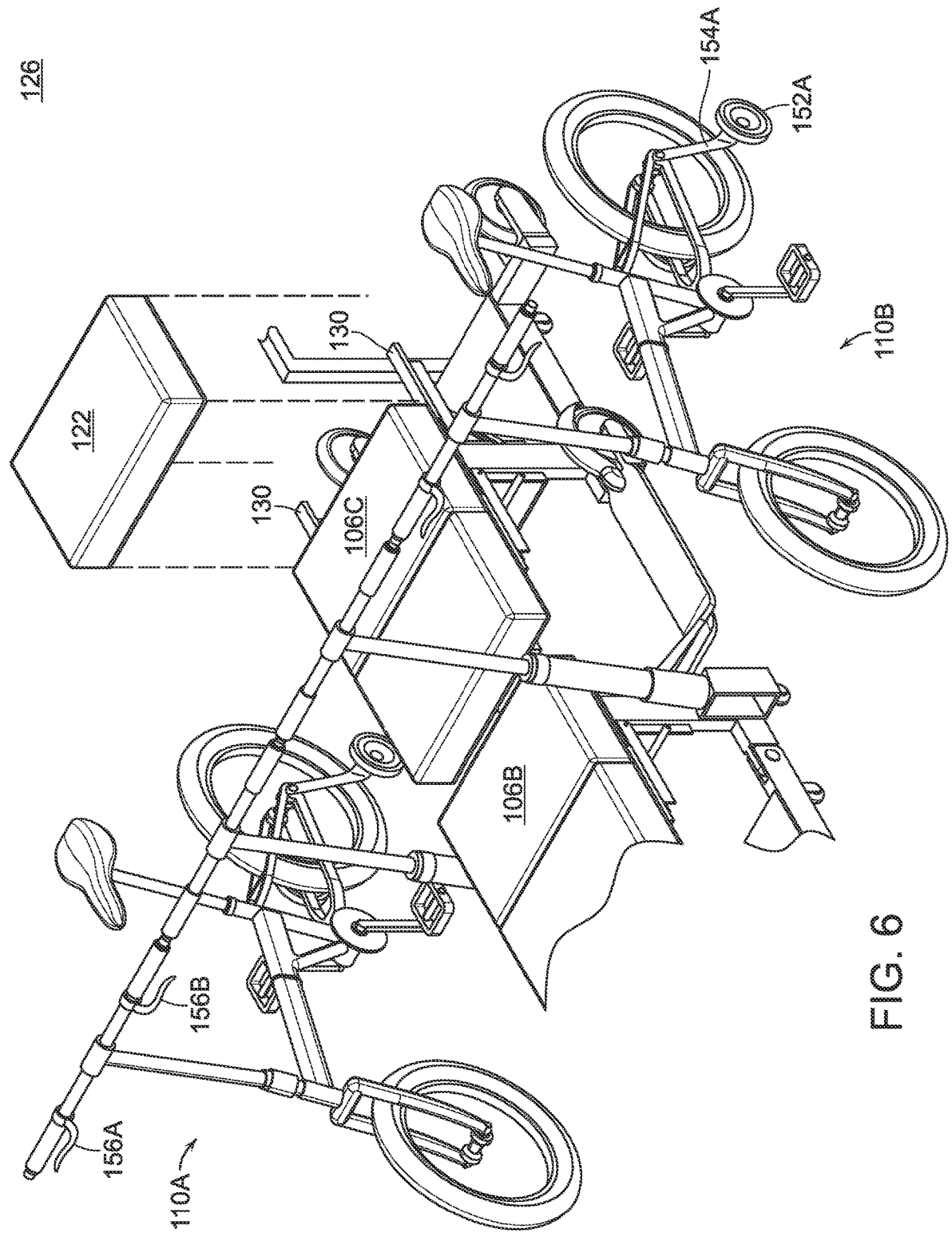
FIG. 6 depicts a perspective view of a middle portion of a human-powered vehicle, where a new seat portion is configured to be received by at least two extension components that extend from a second side of a third seat portion to a second side of a fourth seat portion, such that the new seat portion resides between the third seat portion and the fourth seat portion, according to at least some embodiments described herein.

In some examples, the second side of each of the four seat portions 106A, 106B, 106C, 106D comprises at least two extension components 130 (of FIG. 4, FIG. 5, and FIG. 6). In examples, the at least two extension components 130 are cylindrical or rectangular in shape. However, other shapes not explicitly listed herein are contemplated. The at least two extension components 130 are configured to extend from the second side of the first seat portion 106A to the second side of the second seat portion 106B, as depicted in FIG. 4 and FIG. 5. When extended, the at least two extension components 130 are configured to receive a fifth seat portion 120 (as depicted in FIG. 5) between the first seat portion 106A and the second seat portion 106B.

In another example and as depicted in FIG. 6, the at least two extension components 130 are configured to extend from the second side of the third seat portion 106C to the second side of the fourth seat portion 106D. As depicted in FIG. 6, when extended, the at least two extension components 130 are configured to receive a sixth seat portion 122 between the third seat portion 106C and the fourth seat portion 106D (of FIG. 1, FIG. 2, and FIG. 3). The fifth seat portion 120 and the sixth seat portion 122 may be considered a "fill-in" cushion, similar to the cushions 144A, 144B, 144C, and 144D. The fifth seat portion 120 and the sixth seat portion 122 may be attached to the human-powered vehicle 100 via Velcro, or another fixation means.

The handle assembly of the human-powered vehicle 100 allows for steering of the human-powered vehicle 100 by controlling a direction of the wheel members 102. The handle assembly includes at least a first handle portion 108A and a second handle portion 108B, as depicted in FIG. 3. The first handle portion 108A and the second handle portion 108B may each have a first handle disposed opposite a second handle. For example, the second handle portion 108B may include a first handle 112A disposed opposite a second handle 112B, as depicted in FIG. 3. The first handle portion 108A and the second handle portion 108B may form a handlebar and may be circumferentially surrounded by handlebar grips. In some examples, the handlebar grips comprise a rubber material.

In some examples, the handle assembly may only be used by the "driver" to control an angle of wheel members 102 of the first portion 124 with respect to the axis of travel of the human-powered vehicle 100. The first handle portion 108A is attached to the wheel members 102 associated with the first portion 124 of the human-powered vehicle 100 and to the first portion 104A of the deck assembly. The second handle portion 108B is attached to the wheel members 102 associated with the middle portion 126 of the human-powered vehicle 100 and to the third portion 104C of the deck assembly.

In some examples, one or more mirrors 158 (depicted at least in FIG. 1, FIG. 2, FIG. 3, and FIG. 7) may be affixed to the handle assembly of the human-powered vehicle 100. The one or more mirrors 158 may be used to view traffic, other individuals, and/or other objects along the path of travel of the human-powered vehicle 100. In some examples, the one or more mirrors 158 are removable and may be affixed to the handlebars of a first bicycle 110A, a second bicycle 110B, and/or a third bicycle 110C.

As depicted in FIG. 3, the deck support frame 140, 142 of the human-powered vehicle 100 is attached to both the deck assembly and to the handle assembly. The deck support frame 140, 142 comprises a strong, but light-weight material. In examples, the deck support frame 140, 142 may comprise an aluminum material, a steel material, an alloy material, a composite material, among other materials not explicitly listed herein. In further examples, the deck support frame 140, 142 may include approximately 1 inch by approximately 2 inch aluminum tubing. In some examples, the deck support frame 140, 142 may include one or more lights 146 (as depicted in FIG. 1). The one or more lights 146 may include battery-operated lights, rechargeable lights, light-emitting diode (LED) lights, among other lights not explicitly described herein.

As depicted in FIG. 3, the human-powered vehicle 100 may also include the first bicycle 110A having a first handle 114A disposed opposite a second handle 114B and the second bicycle 110B having a first handle 114C disposed opposite a second handle 114D. As described, the second handle portion 108B may include a first handle 112A disposed opposite a second handle 112B. The second handle 114B of the first bicycle 110A is affixed to the first handle 112A of the second handle portion 108B to affix the first bicycle 110A to the human-powered vehicle 100. Moreover, the first handle 114C of the second bicycle 110B is affixed to the second handle 112B of the second handle portion 108B to affix the second bicycle 110B to the human-powered vehicle 100.

Figure 7:
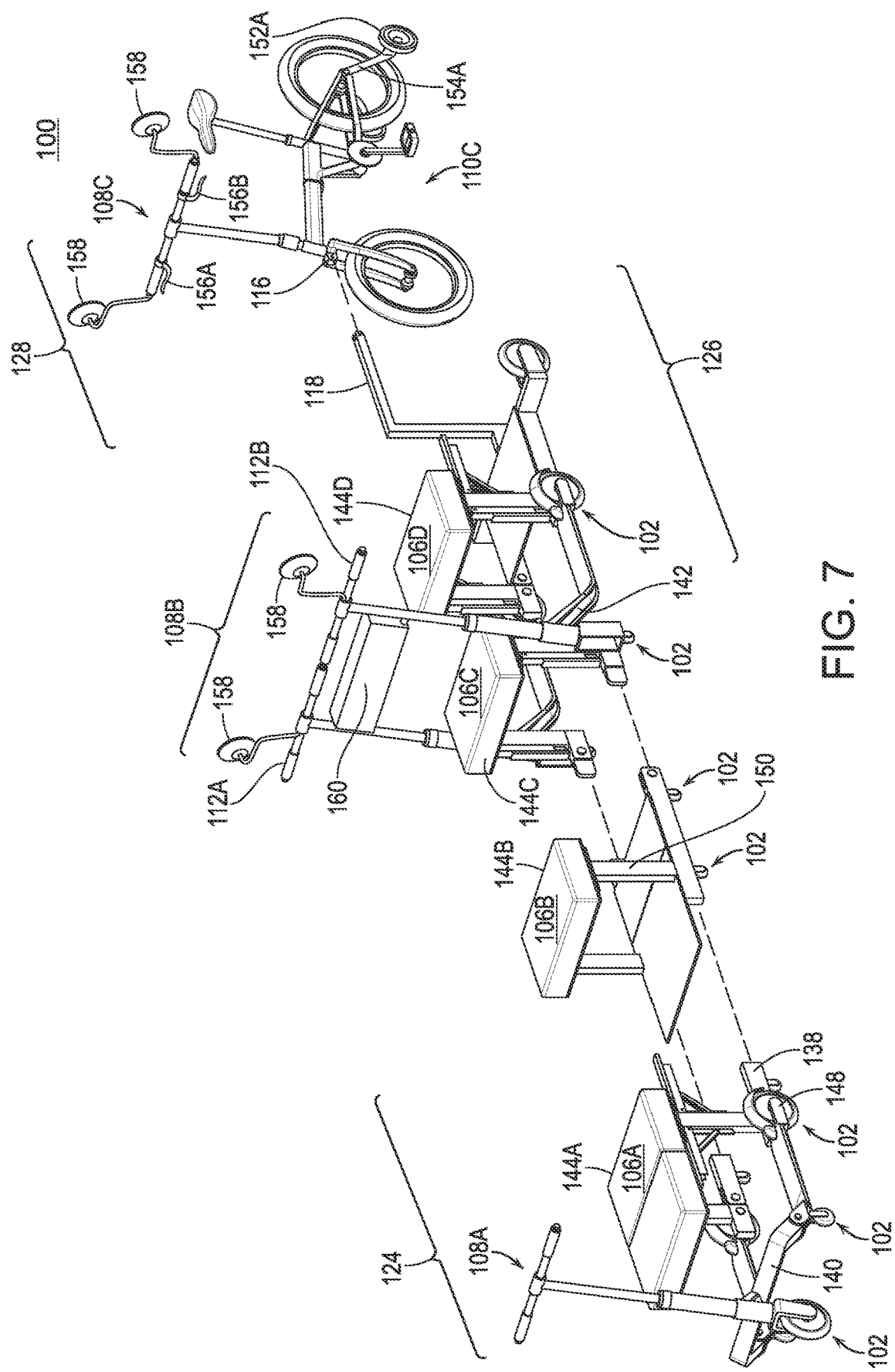
FIG. 7 depicts another perspective view of a human-powered vehicle upon which users can ride, according to at least some embodiments described herein.

The human-powered vehicle 100 may also include a rear component 118 (as depicted in FIG. 1, FIG. 3, and FIG. 7) affixed to the fourth portion 104D of the deck assembly. A head tube 116 of the third bicycle 110C is affixed to the rear component 118 to affix the third bicycle 110C to the human-powered vehicle 100 (as depicted in FIG. 1, FIG. 3, and FIG. 7). In some examples, the third bicycle 110C (depicted in FIG. 1, FIG. 2, FIG. 3, and FIG. 7) is an in-line bicycle. It should be appreciated that the rear component 118 may be affixed to a rear of any of the four portions 104A, 104B, 104C, 104D of the deck assembly. In additional examples, each of the first bicycle 110A, the second bicycle 110B, and the third bicycle 110C may include additional stabilizing wheels 152A, 152B, where a first stabilizing wheel 152A is disposed opposite a second stabilizing wheel 152B (depicted at least partially in FIG. 1, FIG. 2, FIG. 3, FIG. 6, and FIG. 7). The first stabilizing wheel 152A may be affixed to each of the first bicycle 110A, the second bicycle 110B, and the third bicycle 110C via a first component 154A. The second stabilizing wheel 152B may be affixed to each of the first bicycle 110A, the second bicycle 110B, and the third bicycle 110C via a second component 154B. At least the first component 154A is depicted in FIG. 1, FIG. 2, FIG. 3, FIG. 6, and FIG. 7. It should be appreciated that the second component 154B is configured similarly to the first component 154A.

In an example, a size of the human-powered vehicle 100 with the third bicycle 100C attached may be approximately 15 feet and 9 inches in length by 24 inches in width. In another example, the human-powered vehicle 100 with the first bicycle 110A and the second bicycle 110B attached may be approximately 7 feet wide at the handlebars.

In examples, the first bicycle 110A, the second bicycle 110B, and the third bicycle 110C may be approximately 60 inches in length by 24 inches in width at the handlebars and may be adjustable from 30 inches in height to 44 inches in height. A seat of each of the first bicycle 110A, the second bicycle 110B, and the third bicycle 110C may be approximately 24 inches in height to approximately 36 inches in height. In examples, the wheel members 102 of the first bicycle 110A, the second bicycle 110B, and the third bicycle 110C may be configured as stabilizing wheels and may be approximately 6 inch solid rubber and may have approximately 19 inch wheel centers.

The brake assembly of the human-powered vehicle 100 is attached to the handle assembly and is engageable to the wheel members 102 via at footbrakes 148 (as depicted in at least FIG. 1, FIG. 2, FIG. 3, FIG. 4, FIG. 5, and FIG. 7) associated with the wheel members 102. The handlebar of each of the first bicycle 110A, the second bicycle 110B, and the third bicycle 110C may have a first handle disposed opposite a second handle. In examples, the brake assembly includes handbrakes (e.g., a first handbrake 156A associated with the first handle and a second handbrake 156B associated with the second handle of the third bicycle 110C, as depicted in FIG. 1, FIG. 2, FIG. 3, FIG. 6, and FIG. 7) and brake cable pulls present on the first bicycle 110A, the second bicycle 110B, and/or the third bicycle 110C. It should be appreciated that, as depicted in FIG. 3, each of the first bicycle 110A, the second bicycle 110B, and the third bicycle 110C have the first handbrake 156A associated with the first handle and the second handbrake 156B associated with the second handle. The brake assembly allows for braking of the human-powered vehicle 100.

It should be appreciated that the human-powered vehicle 100 includes numerous removable components, such as the first bicycle 110A, the second bicycle 110B, and the third bicycle 110C, the first handle 114A of the first bicycle 110A, the second handle 114B of the first bicycle 110A, the first handle 114C of the second bicycle 110B, the second handle 114D of the second bicycle 110B, the one or more mirrors, and the four seat portions 106A, 106B, 106C, 106D, among other components not explicitly listed herein. Specifically, the first bicycle 110A, the second bicycle 110B, and the third bicycle 110C may engage with the human-powered vehicle 100 via quick lock/release fittings. Therefore, the first bicycle 110A, the second bicycle 110B, and the third bicycle 110C may be temporarily attached to the human-powered vehicle 100. In other examples, interchangeable components of the human-powered vehicle 100 may include the first bicycle 110A, the second bicycle 110B, and the third bicycle 110C, the first handle 114A of the first bicycle 110A, the second handle 114B of the first bicycle 110A, the first handle 114C of the second bicycle 110B, the second handle 114D of the second bicycle 110B, the one or more mirrors.

The human-powered vehicle 100 and various components of the human-powered vehicle 100 are adjustable. For example, the human-powered vehicle 100, the first bicycle 110A, the second bicycle 110B, and the third bicycle 110C are foldable. In further examples, components of the human-powered vehicle 100 may be adjusted for differing lengths or widths of the human-powered vehicle 100. For example, the middle portion 126 of the human-powered vehicle 100 may be removed such that the first portion 124 of the human-powered vehicle 100 may be affixed to the second portion 128 of the human-powered vehicle 100 to form a smaller vehicle.

As another example, the deck support frame may be adjustable such that the human-powered vehicle 100 may have a larger or smaller width and/or may have a larger or smaller length. The human-powered vehicle 100 may also include one or more levers to lock or release the entire human-powered vehicle 100. In another example, the first portion 124 of the human-powered vehicle 100 affixes to the middle portion 126 of the human-powered vehicle 100 via a trailer hitch assembly 138 (of FIG. 1, FIG. 2, FIG. 3, FIG. 4, FIG. 5, and FIG. 7). Moreover, in examples, the human-powered vehicle 100, the first bicycle 110A, the second bicycle 110B, and the third bicycle 110C are foldable.

Each of the passengers may engage in one or more actions when using the human-powered vehicle 100. The actions may include: pushing off the ground with a foot of the passenger, pedaling pedals on a bicycle of the first bicycle 110A, the second bicycle 110B, and the third bicycle 110C, standing upon the first side of a portion of the four portions 104A, 104B, 104C, 104D of the deck assembly, sitting upon the first side of a portion of the four seat portions 106A, 106B, 106C, 106D of the seating assembly, and laying between the multiple seat portions of the four seat portions 106A, 106B, 106C, 106D, among other actions. In additional examples, the passengers may be walking, jogging, running, and/or rollerblading and may propel the human-powered vehicle 100 by holding onto one or more portions of the human-powered vehicle 100.

As has been eluded to, the human-powered vehicle 100 may allow for group travel. Group travel is a means to propel the human-powered vehicle 100 by at least two passengers contributing their force as the power sources. As an illustrative example, at least one of the passengers may move the human-powered vehicle 100 beginning with a slow and casual walk while holding onto a portion of the human-powered vehicle 100, such as a portion of the second handle portion 108B. Additional passengers may ride on the human-powered vehicle 100 as it is being propelled forward by the at least one of the passengers walking and holding onto the portion of the second handle portion 108B of the human-powered vehicle 100. The additional passengers may then engage in an action to help propel the human-powered vehicle 100 forward, such as pedaling one or more of the first bicycle 110A, the second bicycle 110B, and the third bicycle 110C, pushing off the ground, etc.

It should be appreciated that any combination of actions may be used to propel the human-powered vehicle 100. For example, a first passenger may be rollerblading while pushing the human-powered vehicle 100, while a second passenger rides upon the human-powered vehicle 100 and is pedaling pedals of the first bicycle 110A. In another example, the first passenger may be running while pushing the human-powered vehicle 100, while a second passenger lays down on one or more of the four seat portions 106A, 106B, 106C, 106D and does not put in any force to move the human-powered vehicle 100. In a further example, the first passenger may be riding on a skateboard while pushing the human-powered vehicle 100, while a second passenger is standing on at least a portion of the four portions 104A, 104B, 104C, 104D of the deck assembly and does not put in any force to move the human-powered vehicle 100.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A human-powered vehicle upon which users can ride, the human-powered vehicle comprising:
   a wheel assembly including:
   wheel members;
   sets of axles upon which the wheel members are mounted;
   bracket members upon which the sets of axels are mounted; and
   fender members disposed about the wheel members and mounted to the bracket members;
   a deck assembly having a first side disposed opposite a second side and comprising at least four portions independent from one another, wherein the second side of the deck assembly is mounted upon the wheel assembly;
   a seating assembly comprising at least four seat portions independent from one another, each of the at least four seat portions having a first side disposed opposite a second side, wherein the second side of each of the at least four seat portions is affixed to a component, and wherein each component is affixed to the wheel assembly;
   a handle assembly comprising at least a first handle portion and a second handle portion, wherein the first handle portion is attached to a first member of the wheel members and to a first portion of the at least four portions of the deck assembly, and wherein the second handle portion is attached to a middle member of the wheel members and to a third portion of the at least four portions of the deck assembly;
   a deck support frame attached to the deck assembly and to the handle assembly;
   a brake assembly attached to the handle assembly and being engageable to the wheel members;
   wherein the second handle portion of the at least two handle portions comprises a first handle disposed opposite a second handle;
   a first bicycle having a first handle disposed opposite a second handle, wherein the second handle of the first bicycle is affixed to the first handle of the second handle portion to affix the first bicycle to the human-powered vehicle;
   a second bicycle having a first handle disposed opposite a second handle, wherein the first handle of the second bicycle is affixed to a second handle of the second handle portion to affix the second bicycle to the human-powered vehicle; and
   a rear component affixed to a first side of any portion of the at least four portions of the deck assembly, wherein a head tube of a third bicycle is affixed to the rear component to affix the third bicycle to the human-powered vehicle.

2. The human-powered vehicle of claim 1,
   wherein each of the users engage in an action when using the human-powered vehicle, and
   wherein the action is selected from the group consisting of: pushing off the ground with a foot of the user, standing upon the first side of a portion of the at least four portions of the deck assembly, and sitting upon the first side of a portion of the at least four seat portions of the seating assembly.

3. The human-powered vehicle of claim 1, wherein the second side of each of the at least four seat portions of the seating assembly comprises at least two extension components.

4. The human-powered vehicle of claim 3,
   wherein the at least two extension components are configured to extend from the second side of a first seat portion of the at least four seat portions to the second side of a second seat portion of the at least four seat portions, and
   wherein, when extended, the at least two components are configured to receive another seat portion between the first seat portion and the second seat portion.

5. The human-powered vehicle of claim 4,
   wherein each of the users engage in an action when using the human-powered vehicle, and
   wherein the action is selected from the group consisting of: standing upon the first side of a portion of the at least four portions of the deck assembly, sitting upon the first side of a portion of the at least four seat portions of the seating assembly, and laying between the first seat portion, the other seat portion, and the second seat portion.

6. A human-powered vehicle upon which users can ride, the human-powered vehicle comprising:
   a wheel assembly including:
   wheel members;
   sets of axles upon which the wheel members are mounted;
   bracket members upon which the sets of axels are mounted; and fender members disposed about the wheel members and mounted to the bracket members;

a deck assembly having a first side disposed opposite a second side and comprising at least four portions independent from one another, wherein the second side of the deck assembly is mounted upon the wheel assembly;

a seating assembly comprising at least four seat portions independent from one another, each of the at least four seat portions having a first side disposed opposite a second side,
  wherein the second side of each of the at least four seat portions is affixed to a component, and
  wherein each component is affixed to the wheel assembly;

a handle assembly comprising at least a first handle portion and a second handle portion,
  wherein the first handle portion is attached to a first member of the wheel members and to a first portion of the at least four portions of the deck assembly,
  wherein the second handle portion is attached to a middle member of the wheel members and to a third portion of the at least four portions of the deck assembly, and
  wherein the second handle portion comprises a first handle disposed opposite a second handle;

a deck support frame attached to the deck assembly and to the handle assembly; and a brake assembly attached to the handle assembly and being engageable to the wheel members;

wherein the human-powered vehicle is foldable.

7. The human-powered vehicle of claim 6, further comprising:

a first bicycle having a first handle disposed opposite a second handle;

a second bicycle having a first handle disposed opposite a second handle,
  wherein the second handle of the first bicycle is affixed to the first handle of the second handle portion to affix the first bicycle to the human-powered vehicle, and
  wherein the first handle of the second bicycle is affixed to the second handle of the second handle portion to affix the second bicycle to the human-powered vehicle; and a rear component affixed to a first side of any portion of the at least four portions of the deck assembly, wherein a head tube of a third bicycle is affixed to the rear component to affix the third bicycle to the human-powered vehicle.

8. The human-powered vehicle of claim 7, wherein each of the first bicycle, the second bicycle, and the third bicycle are foldable.

9. The human-powered vehicle of claim 6, wherein a portion of the at least four portions of the deck assembly comprises a receptacle configured to house one or more objects.

10. The human-powered vehicle of claim 6,
  wherein a first portion and a third portion of the at least four portions of the deck assembly comprise a first shape,
  wherein a second portion and a fourth portion of the at least four portions of the deck assembly comprise a second shape, and
  wherein the first shape differs from the second shape.

11. A foldable human-powered vehicle upon which users can ride, the human-powered vehicle comprising:

a wheel assembly including:
  wheel members;
  sets of axles upon which the wheel members are mounted;
  bracket members upon which the sets of axels are mounted; and
  fender members disposed about the wheel members and mounted to the bracket members;

a deck assembly having a first side disposed opposite a second side and comprising at least four portions independent from one another, wherein the second side of the deck assembly is mounted upon the wheel assembly;

a seating assembly comprising at least four seat portions independent from one another, each of the at least four seat portions having a first side disposed opposite a second side,
  wherein the second side of each of the at least four seat portions is affixed to a component, and
  wherein each component is affixed to the wheel assembly;

a handle assembly comprising at least a first handle portion and a second handle portion,
  wherein the first handle portion is attached to a first member of the wheel members and to a first portion of the at least four portions of the deck assembly,
  wherein the second handle portion is attached to a middle member of the wheel members and to a third portion of the at least four portions of the deck assembly, and
  wherein the second handle portion comprises a first handle disposed opposite a second handle;

a deck support frame attached to the deck assembly and to the handle assembly;

a brake assembly attached to the handle assembly and being engageable to the wheel members;

a first bicycle having a first handle disposed opposite a second handle; and a second bicycle having a first handle disposed opposite a second handle,
  wherein the second handle of the first bicycle is affixed to the first handle of the second handle portion to affix the first bicycle to the human-powered vehicle, and
  wherein the first handle of the second bicycle is affixed to the second handle of the second handle portion to affix the second bicycle to the human-powered vehicle.

12. The human-powered vehicle of claim 11, further comprising:

a rear component affixed to a first side of any portion of the at least four portions of the deck assembly, wherein a head tube of a third bicycle is affixed to the rear component to affix the third bicycle to the human-powered vehicle.

13. The human-powered vehicle of claim 12, wherein the human-powered vehicle, the first bicycle, the second bicycle, and the third bicycle are foldable.

14. The human-powered vehicle of claim 11,
  wherein the second side of each of the at least four seat portions of the seating assembly comprises at least two extension components,
  wherein the at least two extension components are configured to extend from the second side of a first seat portion of the at least four seat portions to the second side of a second seat portion of the at least four seat portions, and wherein, when extended, the at least two components are configured to receive another seat portion between the first seat portion and the second seat portion.

15. The human-powered vehicle of claim 14,
wherein each of the users engage in an action when using the human-powered vehicle, and
wherein the action is selected from the group consisting of: pushing off the ground with a foot of the user, pedaling pedals on a bicycle of the first bicycle, the second bicycle, and the third bicycle, standing upon the first side of a portion of the at least four portions of the deck assembly, sitting upon the first side of a portion of the at least four seat portions of the seating assembly, and laying between the first seat portion, the other seat portion, and the second seat portion.

\* \* \* \* \*